3,660,566
EXTRACTION OF LIPID AND CELLULAR FRACTIONS FROM THE STRATUM CORNEUM OF ANIMAL SKIN

Leonard J. Vinson, Glen Rock, and Thomas Masurat, Fort Lee, N.J., assignors to Lever Brothers Company, New York, N.Y.
Continuation of application Ser. No. 351,010, Mar. 11, 1964. This application June 12, 1969, Ser. No. 835,895
Int. Cl. A61k *11/00*
U.S. Cl. 424—95
4 Claims

ABSTRACT OF THE DISCLOSURE

A method for extracting stratum corneum from epidermis and separating it into a lipid-rich fraction and a cellular fraction is described as well as compositions of matter containing said lipid fraction and cellular fraction.

---

This application is a continuation of application Ser. No. 351,010, filed Mar. 11, 1964.

This invention relates to improved compositions for treating the skin and the method of preparing such compositions.

Skin is known to perform very important and vital functions in the maintenance of body integrity. A chief function is to protect against environmental irritants and to prevent the loss of body moisture. This is accomplished by the outer layer of the skin, that is the epidermis, which is composed of cells that are propagated and continuously shed throughout the life of the animal or person. The epidermal cells, in propagating, are pushed outwardly and eventually die. In the process of dying such cells become keratinized and form a horny outer layer, i.e., the stratum corneum. The stratum corneum is a highly refractory layer of keratinized cells containing lipids and other substances. However, in some instances, the protection afforded by the stratum corneum has been found to be inadequate. These instances include certain adverse environmental conditions such as low humidity for prolonged periods of time, exposure to solvents, detergents and corrosive agents.

Compositions containing fatty materials have been proposed for use as skin conditioners and skin protective agents. However, they leave much to be desired in obtaining this purpose. In some instances it has been suggested to add other materials, such as a modified gelatin as in United States Pat. No. 3,016,334, to such fatty materials in order to achieve skin conditioning and skin protective properties.

It is an object of our invention to produce compositions which will reduce the penetration of foreign substances such as acids and other chemicals through the outer skin layers and to increase the resistance of the skin to such materials.

Still another object of the invention is to provide compositions which will improve the barrier properties of the epidermis of the skin.

In accordance with one aspect of the present invention, we have isolated the stratum corneum from the epidermis and have separated it by solvent extraction into two major components: (1) a lipid-rich fraction (soluble in the solvent) and (2) a cellular fraction (insoluble) consisting of morphologically intact dissociated stratum corneum cells substantially free of lipids and water-soluble components.

An important physical property of dissociated stratum corneum cells is that when they are exposed to water they clump together into tough, fibrin-like clots. However, in non-polar liquids such as ethyl ether they can be freely suspended without clumping. By utilizing this property, or other suitable methods, the loose cells can be reaggregated into a compact homogeneous keratin membrane. For example, a suspension of dissociated stratum corneum cells in ethyl ether is carefully layered over water contained in a suitable vessel. After the ether layer has evaporated, the cells on the surface of the water gradually become hydrated, and, as they do, they contract into a tough resilinet membrane. During this process, the flat surfaces of the cells remain oriented parallel to the surface of the water, so that when they contract to form a membrane, the orientation of the cells in the reconstituted membrane is similar to their orientation in natural stratum corneum. Morphologically, this membrane closely resembles the original, undissociated stratum corneum (although it does not possess significant barrier properties to water vapor diffusion).

Preliminary characterization and study of the barrier lipid fraction (that is the portion of the stratum corneum removed by solvent extraction) by thin-layer chromatography using various solvent systems, reveals that it consists of at least six major components. A seventh component, which is highly polar and reacts positively to ninhydrin (indicating the presence of amino nitrogen), accounts for 10% or less of the total fraction and may be a non-lipid contaminant.

The total lipid composition of neonatal rat stratum corneum as determined by thin-layer chromatography consists of large amounts of cholesterol esters and/or waxes, relatively large amounts of free fatty acids, triglycerides and free cholesterol. By comparison, the major components of the barrier lipid fraction consist of nonpolar material having a migration rate similar to hydrocarbons, waxes and cholesterol esters, a sizable free cholesterol component and an unresolved polar fraction. Whereas free fatty acids and triglycerides are present in large amounts in the total lipids of stratum corneum, only trace amounts, if any, of these components can be detected in the barrier lipid fraction.

The process of the invention comprises treating the stratum corneum of animal skin, in the absence of substantial amounts of the underlying epidermal tissue and other skin layers, with a solvent capable of removing barrier lipids from said stratum corneum thereby to dissolve said lipids leaving a suspension of tissue in the solvent, separating said solution from the tissue and evaporating said solvent from the solution thereby to cause at least part of the lipid material to precipitate, and recovering the precipitate. In this way there is obtained lipid-rich material from the stratum corneum which is useful in many types of compositions for treating the skin.

The invention also includes compositions of matter for topical application to the skin comprising the lipid-rich material obtained by solvent extraction of the stratum corneum of animal skin and an innocuous vehicle compatible with said lipid-rich material and capable of facilitating entry of the lipid material into the stratum corneum of the skin.

The invention also icnludes the process and discovery of imparting to reconstituted stratum corneum cell membranes and natural stratum corneum which is defective in barrier properties, resistance to moisture loss and to penetration of foreign substances by incorporating in such reconstituted membranes and defective stratum corneum the lipid-rich material removed from the stratum corneum.

In another aspect the invention comprises a process of separating the stratum corneum from the epidermis of animal skin, treating said stratum corneum with a solvent capable of removing lipid from said stratum corneum thereby to dissolve said lipid leaving a suspension of tissue in said solvent, and mechanically dispersing said tissue thereby to disengage individual cells from each other. Upon removing the solvent or dispersing medium from the cells there is obtained a loose free-flowing powder of substantially lipid-free stratum corneum cells of the epidermis of the animal's skin. Such powders are capable of forming a coherent film composed of corneal cells interlocked with each other when dispersed as a layer in an environment containing water.

Certain aspects of the invention are illustrated by the following figures and the ensuing description.

FIG. 1 is a chromatograph of a barrier lipid fraction using certain solvents for carrying out the chromatographic procedure;

FIG. 2 is a chromatograph of a barrier lipid fraction using a different solvent for the chromatographic procedure;

FIG. 3 is a chromatogram of a barrier lipid fraction using still another solvent for the chromatographic procedure;

FIG. 4 is an X-ray diffraction pattern of a dried stratum corneum membrane;

FIG. 5 is an X-ray diffraction pattern of a dried stratum corneum membrane after solvent extraction;

FIG. 6 is an X-ray diffraction pattern of commercial keratin;

FIG. 7 is an X-ray diffraction pattern of material extracted from stratum corneum by solvents;

FIG. 8 is an X-ray diffraction pattern of microcrystalline wax;

FIG. 9 is an infrared absorption spectrum of stratum corneum extract;

FIG. 10 is a photomicrograph of individual stratum corneum cells; and

FIG. 11 is an electron micrograph of a reaggergated stratum corneum membrane.

The following examples illustrate procedures for carrying out the process and obtaining the products of the invention. Unless otherwise indicated, parts are expressed on a weight basis.

EXAMPLE 1

Preparation of stratum corneum membrane

Twenty-four to forty-eight hour old neonatal rats were used as a source of skin because of their relative freedom from hair. The skin was removed from the torso of the newborn rats as a sheet. The layer of subcutaneous fat was removed by careful scraping with a scalpel. The skin sheets were rinsed in distilled water, blotted dry, spread on filter paper and stored in a deep freeze at $-15°$ C. Forty to fifty neonatal skins were suspended in 50 ml. of a digestion solution consisting of Krebs-Ringer bicarbonate buffer containing 2 M urea and 0.5% by weight of trypsin (Nutritional Biochem. Co. X2). The skins were incubated for 30-40 minutes at 37° C. with shaking. At the end of this period, the epidermal layer, including the stratum corneum, was separated from the dermis with forceps. The sheets of epidermis were resuspended in 50 ml. of a fresh digestion solution, as described, containing 50,000 units of penicillin G (potassium salt) and 20,000 units of streptomycin sulfate (to retard bacterial growth). After 18 hours incubation at 37° C. with shaking, the intact sheets of stratum corneum were removed from the solution, washed several times in distilled water and stored in a beaker of distilled water in the refrigerator.

Extraction of "barrier lipid" fraction

Sheets of stratum corneum prepared as described above were suspended in a solution of chloroform-methanol (2:1, by volume) by mechanical agitation. A large number of the stratum corneum cells became dissociated from the membrane. These cells could be seen as a hazy suspension in the chloroform-methanol solution when the suspension was permitted to dry on an exposed glass surface. An amorphous, granular deposit of barrier lipid was formed in which individual stratum corneum cells were imbedded.

In an alternative procedure, the stratum corneum membranes were blotted with filter paper and 15 grams of the damp stratum corneum membranes were suspended in 100 ml. of a solution consisting of two parts by volume of chloroform to one part methanol, and were homogenized in a "Virtis" blender at top speed (about 20,000 r.p.m.) for 3–4 minutes. A magnetic stirrer can be used instead of a blender. This resulted in a virtually complete dissociation of the stratum corneum membrane into individual cells, but the cells were not ruptured. About 50 ml. of methanol were added to the suspension in order to reduce the density of the solvent sufficiently to permit sedimentation of the cells by centrifugation. The cell suspension was centrifuged for 10 minutes in an International Model V centrifuge at 1200 r.p.m. The supernatant volume was decanted and the cells were washed 4–5 times by resuspending them in about 60 ml. of equal parts by volume of chloroform-methanol. The supernatants of the washes were combined with the supernatant from the first centrifugation and filtered through Whatman #1 paper.

The combined chloroform-methanol extracts of the stratum corneum cells were partially evaporated in a rotary flash evaporator until a copious white precipitate appeared. The precipitate was allowed to settle overnight in the refrigerator and subsequently collected by centrifugation. This was the barrier lipid fraction.

Thin layer chromatography of barrier lipid extract

The barrier lipid extract was tested by thin layer chromatography on Silica Gel G (Brinkmann Inst. Inc.). The general methodology used for thin layer chromatography is described in "Thin Layer Chromatography" by Kurt Randerath, Academic Press (1963). The chromatograms were developed by spraying with chromic acid and heating.

A chromatogram was also taken on a barrier lipid fraction eluted with a relatively non-polar solvent, hexane-ether (4:1, v./v.). This is shown in FIG. 1. The barrier lipid in this system is partitioned into two major fractions: (1) a poorly resolved polar fraction remaining near the origin, and (2) a non-polar fraction migrating with the solvent front. By reference to the lipid standards, a major component of the unresolved polar fraction migrates similarly to free cholesterol, whereas the non-polar fraction of the barrier lipid migrates in this system similarly to known mixtures of hydrocarbons, waxes and cholesterol esters. No component of the barrier lipid fraction showed migration properties corresponding to known samples of triolein or stearic acid.

A chromatogram of the barrier lipid fraction in a relatively polar solvent consisting of chloroform-methanol (69:20, v./v.) is shown in FIG. 2. A considerable improvement in resolution of the components of the barrier lipid can be observed in this system. The non-polar components of the barrier lipid fraction migrated with the solvent front, as did the standards of cholesterol esters and waxes. The non-polar fraction was separated into several major components not completely resolved as indicated by the several dark spots near the top of the columns 1, 2 and 3 of FIG. 2. A spot corresponding to a standard sample of free cholesterol can be identified as the third component from the top.

By increasing the polarity of the solvent system (chloroform-methanol-water, 75:5:0.5), a further improvement in the resolution of the polar components of the barrier lipid fraction was obtained (FIG. 3). This is shown by the spots appearing at levels below cholesterol.

X-ray diffraction examination of barrier lipid fraction

The X-ray diffraction examination was made on a dried stratum corneum membrane prepared by the procedure described above before extraction with the solvent. This examination showed a strong line at 4.15 A. and a less intense line at 3.72 A. (as shown in FIG. 4). These two lines are the major reflections of the unknown material in the stratum corneum. A third outer line was also observed at 3.02 A. A weak inner line at 4.5 A was also observed and this is probably due to keratin.

An X-ray diffraction examination was also made on the stratum corneum after extraction with chloroform-methanol. This is presented in FIG. 5. The pattern showed that the material responsible for the strong reflections at 4.15 A. and 3.72 A. was removed by the extraction procedure. The diffraction pattern of the solvent-extracted stratum corneum was similar to that obtained from a sample of commercial keratin (FIG. 6).

Barrier lipid material was recovered from the chloroform-methanol extract of the stratum corneum and a diffraction pattern was obtained on this material, which is presented in FIG. 7. This pattern reveals two strong lines at 4.15 A. and 3.72 A., which were originally observed in the diffraction pattern of the dried intact stratum corneum membrane. The spacing of the lines of this material is indicative of an orthorhombic packing of hydrocarbon chains. On the basis of the diffraction pattern, most of the material appears to be in the form of hydrocarbon chains. Typical of such packing is microcrystalline wax, which has a diffraction pattern as shown in FIG. 8.

Infrared analysis of stratum corneum extract

The barrier lipid material precipitated from the chloroform-methanol extract of stratum corneum was submitted for infrared analysis. The spectrum obtained (FIG. 9) indicates the presence of the following functional groups:

(1) Ester
(2) Primary alcohol
(3) Amide
(4) Long chain hydrocarbon

The presence of amide groups is indicated by the absorption bands at 3 microns and the bands at 6.4 and 6.8 microns. Hydroxyl groups are indicated by the absorption bands at 3 and 9.5 microns and ester linkages by absorption bands at 5.7 and 8.5 microns. The length of the hydrocarbon chains are estimated to be about 11 to 19 carbon atoms by comparing the intensity of the absorption peaks at 17.1 and 13.8 microns. The infrared trace revealed little or no aromaticity, and no indication of the presence of alicyclic rings. The ratio of functional groups present was estimated as: Eester: Amide: Hydroxyl; 1:3–4:3–5.

Chemical analysis

A preliminary chemical analysis was performed on a sample of the barrier lipid after acid hydrolysis. Five milligrams of the material together with 3 ml. of 6 N HCl were placed in an ampoule. The ampoule was sealed and the material was hydrolyzed for 18 hours at 120° C. During the hydrolysis considerable charring took place. After hydrolysis, the HCl was removed under a stream of nitrogen, and the dry residue was extracted with ethyl ether and then with water.

The water-soluble extract of the hydrolysate gave a negative test for carbohydrate by the orcinal reaction and anthrone reaction. The Fiske-SubbaRow test for inorganic phosphate was negative, ruling out the presence of phospholipids in the material. However, the water-soluble extract gave a strongly positive ninhydrin reaction.

EXAMPLE 2

A sheet of intact ammonia-separated guinea pig epidermis was placed in a diffusion chamber divided by the skin into tow compartments containing 0.5% nickel chloride in the 04% aqueous sodium lauryl sulfate in both compartments. The contents of one compartment was labeled with $Ni^{63}$.

There was a lag period of over three hours, during which time no diffusion of $Ni^{63}$ through the epidermis could be detected. Then a breakdown of the barrier to diffusion was observed and rapid equilibration of the label between the two compartments occurred. When the solutions were replaced by 0.5% nickel chloride in water (after thorough washing to remove the detergent), rapid diffusion of $Ni^{63}$ occurred so that more than 10% of the label in the first chamber diffused into the test chamber in the first 20 minutes. When the same epidermis was exposed to a solution of the barrier lipid fraction in chloroform-methanol (2:1) for five minutes and re-exposed to the nickel chloride solutions, the rate of diffusion was reduced to 1/15 the rate of that measured previously.

This example showed that the sodium lauryl sulfate damaged the barrier of the epidermis, allowing the nickel to penetrate. The barrier properties of the epidermis were restored by the barrier lipid fraction.

EXAMPLE 3

A lipid fraction similar to the barrier lipid from the neonatal rat stratum corneum was obtained from calf skin epidermis (composed of the Malpighian and granulosum layers in addition to the corneum). The procedure for the isolation of the employed epidermal lipid fraction (ELF) was that described in Example 1.

Five adult female guinea pigs were epilated on both sides of the back. Three days after epilation these animals were treated with dimethyl sulfoxide (DMSO) which has the effect of reducing the barrier effectiveness of the skin. Immediately following DMSO treatment, one side was treated with 1.0 ml. of a suspension of 6.0 mg./ml. of epidermal barrier lipid fraction (ELF) in USP absolute ethanol. The same volume of ethanol was evaporated on the opposite DMSO-treated site (control).

The animals were sacrificed about two hours after application. The skin was excised and the water diffusion rate determined on areas treated with the test material and the control areas.

Results

The water diffusion rates (mg./cm.$^2$/hr.) of the control and test skins were calculated and are tabulated in the following:

| Animal number | Control | Treated |
|---|---|---|
| 1 | 1.396 | .682 |
| 2 | 1.533 | .385 |
| 3 | 3.342 | .868 |
| 4 | 2.858 | .534 |
| 5 | .996 | .645 |
| Average | 2,025 | .623 |

The results indicate the ELF fraction reduced the water diffusion rate of DMSO-treated skin more than threefold.

EXAMPLE 4

Five female guinea pigs were epilated on both sides of the back and allowed to recover for three days. On the third day all the animals were treated with dimethyl sulfoxide (DMSO).

Immediately after DMSO treatment, one side was treated with 1.0 ml. of a suspension of 44 mg./ml. of epidermal lipid fraction (ELF) (prepared as described in Example 3) in USP absolute ethanol. The same volume (1.0 ml.) of ethanol was evaporated on the opposite DMSO-treated surface to serve as vehicle control.

This procedure was repeated at hourly intervals for a total of three applications, at which time the areas were treated with 0.05 ml. of each of three concentrations of croton oil (.037%, .11%, 33%) on the dorsal areas that had been areated with the experimental suspensions or the ethanol alone. Croton oil is a well-known primary irritant known to cause inflammation when applied in appropriate concentrations to skin. Erythema was evaluated after 1 hour, 24 hours and 48 hours.

Results

Inflammation induced by croton oil was rated as follows:

0 = no erythema;
1 = spotty or slight erythema;
2 = uniform pink erythema;
3 = uniform red erythema.

Readings taken 24 hours after treatments are tabulated in the following:

| Animal Number | Control percent | | | ELF-treated, percent | | |
|---|---|---|---|---|---|---|
| | .037 | .11 | .33 | .037 | .11 | .33 |
| 1 | 0 | 0 | 2 | 0 | 0 | 0 |
| 2 | 0 | 1 | 2 | 0 | 0 | 1 |
| 3 | 1 | 2 | 3 | 0 | 1 | 2 |
| 4 | 0 | 1 | 2 | 0 | 1 | 2 |
| 5 | 1 | 2 | 2 | 0 | 1 | 1 |
| Total | 2 | 6 | 11 | 0 | 3 | 6 |

From the results it can be seen that the ELF-treated skin was protected to a significant degree from croton oil irritations as compared with the control skin. At the .037% croton oil level no irritation was observed for the ELF-treated skin while 2 of 5 control sites showed slight irritation. At the intermediate and high levels of croton oil, the total erythema scores for the ELF-treated skins were about ½ that of the control skins.

Examples 2, 3 and 4 show the effectiveness of the barrier lipid fraction (obtained from the stratum corneum) when mixed with lipids extracted from other layers of the skin.

EXAMPLE 5

Preparation of low lipid content stratum corneum cells

After the final chloroform-methanol wash of the stratum corneum treated in Example 1, the stratum corneum cells were suspended in 200 ml. of chloroform-methanol (2:1, v./v.), and stirred with a magnetic stirrer for at least 48 hours at room temperature to extract additional quantities of lipids. At the end of this period sufficient methanol was added to the suspension to sediment the cells by centrifugation. The sedimented cells were freed of the chloroform-methanol solvent, dried by 3-4 washings with anhydrous ethyl ether, then air dried at room temperature. After the last trace of ether had evaporated, the stratum corneum material appeared as a pure white, loosely packed powder. Under microscopic examination the powder was seen to consist of individual, morphologically intact stratum corneum cells. The cells were transferred to vials and stored in a dessicator. A photomicrograph (×400) of the individual cells is shown in FIG. 10.

A chemical analysis was carried out on the dissociated stratum corneum cells. They consist primarily of insoluble protein and polysaccharide. The elemental analysis of the dissociated cells gave the following composition:

| Components: | Percent |
|---|---|
| Carbon | 46.58 |
| Hydrogen | 7.36 |
| Nitrogen | 16.40 |
| Oxygen | 28.00 |
| Sulfur | 1.56 |
| Phosphorus | 0.18 |

Formation of membranes from dissociated stratum corneum cells

Twenty to fifty milligrams of the low lipid content stratum corneum cell powder were suspended in 10 ml. of anhydrous ethyl ether in a loose fitting Tenbroeck homogenizer. Clumps or stratum corneum cells were dispersed by gentle homogenization and the ether suspension was carefully layered over water contained in a 100 ml. beaker having an internal diameter of approximately 5 cm. After the ether layer had completely evaporated a circular stratum corneum membrane was formed with a diameter of 2-3 cm. An electron micrograph (×10,000) of such a typical membrane is presented in FIG. 11.

The water permeability of these membranes was determined. The apparatus used to carry out water permeability tests consists of a pair of rings between which the layer of skin to be tested is clamped. Below the film being tested there is a tightly sealed chamber containing water. The entire assembly is mounted in a dessicator containing "Drierite" maintained at 22° C. The rate of water vapor transmission is calculated by the loss in weight over a measured period of time.

Some of the barrier lipid material was also added to reaggregated stratum corneum membranes to determine the effect of such addition on the rate of water vapor transmission. The hydrated, reaggregated membranes were placed in a solution of chloroform-methanol (2:1, v./v.) containing approximately 8 mg./ml. of the barrier lipid fraction. After a 15 minute exposure to this solution, the membranes were removed and the excess solvent allowed to evaporate. The remaining traces of chloroform were removed by soaking the membranes in methanol. Finally they were rehydrated by placing them in water. The water vapor diffusion rate through natural stratum corneum membranes (from trypsin digested neonatal rat skin) and membranes formed from dissociated stratum corneum cells with and without the addition of barrier lipid fraction are presented in the table.

Water diffusion through natural and reconstituted stratum corneum membranes

| Membrane: | Water diffusion rate (24 hrs.) mg./cm.$^2$/hr. |
|---|---|
| Natural stratum corneum | 0.38 |
| Reaggregated stratum corneum (no barrier lipid added) | 8.37 |
| Reconstituted stratum corneum (barrier lipid added) | 0.10 |

The data show that the addition of barrier lipid fraction to the reaggregated stratum corneum restores to the film substantially the barrier properties of the natural stratum corneum.

EXAMPLE 6

The backs of three guinea pigs (hair removed by epilation) were biopsied at three sites using a 3 mm. (diameter) constant depth punch, set to penetrate into the dermal capillary bed. The treatment of the various sites was as follows:

| Treatment | Comment |
|---|---|
| Site: | |
| A — None | |
| B — Reconstituted corneum membrane. | Edges held to skin by Dovol surgical appliance cement (#262). |
| C — Dissociated stratum corneum cells. | Applied daily. |

One guinea pig was sacrificed at 48 hours, one after six days and the third after nine days. Each wound area was fixed in cold formal calcium. The tissues were processed in a standard histological manner and stained with hemotoxylin and eosin (H & E) before being examined microscopically.

Results

Regeneration of a new epidermal layer was observed to occur in all tissues examined, with sites B and C showing far more rapid regeneration than the control site A. After 48 hours following infliction of injury the treated sites B and C showed complete or nearly complete regeneration of the epidermis in the injured area. After 48 hours the control of the untreated biopsy site showed only a beginning of epidermal regeneration, or not more than 25% of the injured area containing new epidermis. Even after 6 days following infliction of the injury the untreated site did not show complete regeneration of the epidermis. After the 9th day following injury complete regeneration of the epidermis occurred in the untreated site, in contrast to the 48-hour period for regeneration of the epidermis in the case treated with the reconstituted corneum membrane or the one treated with dissociated stratum corneum cells.

Various modifications are contemplated within the scope of the invention. The skin of animals other than neonatal rats, guinea pigs and calves may be used. The skin of adult rats, swine and cows, particularly cow noses and hoofs may be used. Moreover, the whole skin or the whole epidermis may be used as the source of the barrier lipid of the stratum corneum, although those sources will, of course, result in the presence of other materials which may tend to dilute the barrier properties of the barrier lipid fraction.

Enzymes other than trypsin may be used to digest the non-keratinized protein present in the epidermis and/or other layers of the skin. Such enzymes include papain, ficin, chymotrypsin or "Pronase," an enzyme obtained from bacteria.

Furthermore, methods other than enzyme digestion may be used for separating the epidermis or the stratum corneum. Other chemical methods include treatment with simple amines, alkaline materials such as lime or urea, followed by a mechanical scraping. Still another method is treatment with steam or dry heat followed by a mechanical scraping of the stratum corneum.

Solvents other than chloroform-methanol may be used to extract the lipid-rich material from the stratum corneum. Generally, the suitable solvents are those which are of intermediate polarity, that is, those having a hydrophile-lipophile balance in the range of about 0.02 to 50 in an ether-water system. For example, mixtures of non-polar and polar solvents can be used. Such non-polar solvents include chloroform, diethyl ether, hexane, petroleum ether (a mixture of low boiling hydrocarbons boiling up to 70° C.), pyridine, benzene, toluene, carbon tetrachloride, chlorobenzene, cyclohexane and xylene.

Suitable polar solvents to be used in the mixture include methanol, ethanol, butanol (normal or iso), propanol (normal or iso), acetone, methyl acetate, carbon disulfide, dimethylsulfoxide and dimethyl formamide.

Suitable combinations of non-polar and polar solvents include ethyl ether-methanol, chloroform-methanol, hexane-methanol, hexane-acetone, benzene-acetone and petroleum ether-ethanol.

As previously indicated, the invention includes compositions for topical application. Following are several such examples.

EXAMPLE 7

The following is an illustration of a suitable hand cream including the skin barrier extract (barrier lipid fraction) prepared by the procedure of Example 1.

| Components: | Percent |
|---|---|
| Group I: | |
|   Cetyl alcohol | 0.5 |
|   Stearic acid | 13.0 |
|   Mineral oil | 2.0 |
|   Skin barrier extract | 1.0 |
| Group II: | |
|   Glycerol | 12.0 |
|   Triethanolamine | 0.75 |
|   Water | Balance |
| Group III: Perfume | Balance |
| Group IV: Color | Balance |

The Group I and Group II compositions are separately heated to 70–75° C. The Group II composition is then poured into the Group I composition with agitation and cooled at 50° C. Groups III and IV are then also added with agitation.

EXAMPLE 8

The following illustrates the preparation of an ointment including the skin barrier extract prepared by the procedure of Example 1.

| Components: | Percent |
|---|---|
| Petrolatum | 54 |
| Paraffin wax M.P. 59° C. | 22 |
| Ozokerite wax | 4 |
| Beeswax | 6 |
| Lanolin, anhydrous | 13 |
| Skin barrier extract | 1 |
| | 100 |

The composition is heated to 70–75° C. with agitation, cooled to the pour point and then introduced into suitable containers for distribution and sale.

EXAMPLE 9

The following illustrates the preparation of a shampoo including the skin barrier component, prepared by the procedure of Example 1.

| Components: | Percent |
|---|---|
| Group I: | |
|   Oleic acid | 5 |
|   Coconut fatty acids | 4 |
|   Propylene glycol | 5 |
|   Skin barrier component | 1 |
| Group II: | |
|   Triethanolamine | 5.4 |
|   Water | Balance |

The mixture designated Group I is heated until it is clear. It is then cooled and water is added in slow increments with rapid agitation. The mixture designated Group II is also heated with agitation until it is clear. The Group I mixture and the Group II mixture are then mixed together to form the shampoo.

EXAMPLE 10

The following illustrates the preparation of a lotion including the skin barrier extract prepared by the procedure of Example 1.

| Components: | Percent |
|---|---|
| Group I: | |
|   Cetyl alcohol | 1.0 |
|   Diethylene glycol monostearate | 2.0 |
|   Stearic acid | 2.0 |
|   Isopropyl palmitate | 10.0 |
|   Skin barrier component | 1.0 |
| Group II: | |
|   Triethanolamine | 1.0 |
|   Water | 82.7 |
| Group III: Perfume | 0.3 |
| | 100.0 |

The Group I and Group II mixtures are separately heated to 70–75° C. The Group II mixture is then poured into the Group I mixture with stirring and cooled to 50° C., after which the perfume (Group III) is added.

EXAMPLE 11

The following illustrates the preparation of a aerosol lotion including the skin barrier extract prepared by the procedure in Example 1.

The lotion prepared according to Example 10 is converted into an aerosol lotion by mixing 90 parts by weight of the product of Example 10 with 10 parts of a 57/43 mixture (by weight) of the propellants dichlorodifluoromethane and dichlorotetrafluoroethane, respectively.

EXAMPLE 12

A soap or detergent bar including the skin barrier extract prepared according to Example 1 may be prepared as follows: Soap or detergent chips are placed in a solid mixer. The lipid skin barrier extract is dissolved in perfume and added to the chips. Whiteners and $TiO_2$ are added and the total is mixed for 15–20 minutes, after which it is transferred to a hopper for feeding to the milling steps of bar-soap making processes. The barrier lipids may be added directly to the chips in the crutcher if desired.

EXAMPLE 13

The following is a description of a method of making a liquid detergent including the skin barrier extract of the invention.

Liquid detergent

| Components: | Percent |
|---|---|
| Ammonium dodecylbenzene sulfonate | 17.00 |
| Ammonium dodecylphenol (6 - ethylene oxide) sulfate (Alipal DPES–6) | 11.50 |
| Lauric diethanolamide (LDA) | 6.00 |
| Ammonium xylene sulfonate | 9.00 |
| Polystyrene latex (Opacifier) | 0.8 |
| D&C No. 19 (Dye) | 0.0002 |
| Perfume | 0.2 |
| Barrier lipid | 1.00–2.00 |
| Water | Balance |

Combine (in the order listed per 1000 gms. of detergent):

| | Parts |
|---|---|
| Water | 225 |
| Polystyrene latex | 20 |
| Ammonium xylene sulfonate | 225 |

Add with stirring:

| | |
|---|---|
| 28% $NH_4OH$ | 43 |
| Dodecylbenzene sulfonic acid | 170 |
| Lauric diethanol amide | 60 |
| Dodecylbenzene sulfonic acid pH 3.5 to 6.0 | 13 |

Adjust pH to 6.0±0.1 $NH_4OH$—$H_2SO_4$.
Then add the following:

| | |
|---|---|
| Ammonium dodecylphenol (6-ethylene oxide) sufate (57.8% active) | 199 |
| Barrier lipid | 10–20 |
| Perfume (mixed and added together with barrier lipid) | 2 |
| Dye (.2% solution) | 11 |
| Water to make a total of | 1000 |

Final pH 6.5.

In the compositions for topical application, the amount of barrier lipid fraction may be less than the 1–2% illustrated in the foregoing examples. Amounts as low as ½% based on the weight of the composition which impart beneficial properties to the skin may be used. Of course, larger amounts are also useful. Other modifications will be apparent to those skilled in the art.

What is claimed is:
1. The process which comprises
   (a) subjecting either fresh or frozen animal skin to protein digestion of non-keratinized protein by a protein-digesting enzyme in Krebs-Ringer bicarbonate buffer containing 2 M urea for an incubation period of 18 hours at 37° C. with shaking to recover the stratum corneum thereof,
   (b) removing the sheets of stratum corneum from the solution,
   (c) washing the sheets of stratum corneum several times in distilled water,
   (d) bringing the sheets of stratum corneum into contact with a 2:1 by volume mixture of chloroform and methanol with mechanical agitation sufficient to suspend a substantial proportion of stratum corneum cells in the solvent,
   (e) removing the cell suspension by centrifugation,
   (f) subjecting the solvent extract containing water-insoluble barrier lipids to evaporation until a precipitate appears, and
   (g) separating the precipitate by centrifugation, followed by residual solvent evaporation to recover said precipitate.
2. The process which comprises
   (a) subjecting either fresh or frozen animal skin to protein digestion of non-keratinized protein by a protein-digesting enzyme in Krebs-Ringer bicarbonate buffer containing 2 M urea for an incubation period of 18 hours at 37° C. with shaking to recover the stratum corneum thereof,
   (b) removing the sheets of stratum corneum from the solution,
   (c) washing the sheets of stratum corneum several times in distilled water,
   (d) bringing the sheets of stratum corneum into contact with a 2:1 by volume mixture of chloroform and methanol with mechanical agitation thereof to dissolve lipids, leaving a suspension of stratum corneum cells in said solvent,
   (e) separating said solution from said cells,
   (f) mechanically dispersing said cells in a 2:1 by volume chloroform-methanol solvent to disengage individual stratum corneum cells from each other, and
   (g) recovering the stratum corneum cells from the solvent.
3. A preparation of individual morphologically intact stratum corneum cells of the epidermis of animal skin obtained according to the process of claim 2.
4. A power of individual morphologically intact substantially lipid-free stratum corneum cells of the epidermis of animal skin prepared according to claim 3, and capable of forming a coherent film when dispersed as a layer in an environment containing water.

References Cited

UNITED STATES PATENTS

| 3,033,755 | 5/1962 | Jacobi | 424—95 |

FOREIGN PATENTS

| 859,374 | 4/1959 | Great Britain | 424—95 |
| 556,488 | 8/1932 | Germany | 424—95 |

ALBERT T. MEYERS, Primary Examiner
V. C. CLARKE, Assistant Examiner

U.S. Cl. X.R.

195—3 R, 6; 252—129, 152, 161, Digests 2, 13, 14, 16; 424—47, 69, 359, 365

PO-1050
(5/69)

UNITED STATES PATENT OFFICE
CERTIFICATE OF CORRECTION

Patent No. 3,660,566      Dated May 2, 1972

Inventor(s) Leonard J. Vinson and Thomas Masurat

It is certified that error appears in the above-identified patent and that said Letters Patent are hereby corrected as shown below:

Column 2, line 9, "resilinet" should be --resilient--;

line 59, "icnludes" should be --includes--;

Column 3, line 34, "reaggergated" should be --reaggregated--;

Column 5, line 1, "A" should be --A.--;

line 44, "Eester" should be --Ester--;

line 49, "6 N" should be --6 N.--;

line 67, "tow" should be --two--;

line 68, "04%" should be --0.4%--;

Column 6, line 48, "2,025" should be --2.025--;

line 71, "areated" should be --treated--;

Column 7, line 13, "ELF-treated," should be --ELF-treated--;

Column 10, line 70, "a" should be --an--;

Column 11, line 45, "sufate" should be --sulfate--;

Column 12, line 44, "power" should be --powder--.

Signed and sealed this 2nd day of January 1973.

(SEAL)
Attest:

EDWARD M. FLETCHER, JR.            ROBERT GOTTSCHALK
Attesting Officer                   Commissioner of Patents